(12) United States Patent
Barton et al.

(10) Patent No.: US 12,155,615 B2
(45) Date of Patent: Nov. 26, 2024

(54) RANKING CONTENT FOR DISPLAY

(71) Applicant: Snap Inc., Santa Monica, CA (US)

(72) Inventors: Theresa Barton, San Mateo, CA (US);
Yanping Chen, San Jose, CA (US);
Lucas Ou-Yang, Los Angeles, CA
(US); Emre Yamangil, San Francisco,
CA (US); Keyang Zhang, San
Francisco, CA (US); Jiwoon Jeon,
Torrance, CA (US); Jaewook Chung,
Mountain View, CA (US); Wisam
Dakka, San Francisco, CA (US); Xin
Chen, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/101,430

(22) Filed: Jan. 25, 2023

(65) Prior Publication Data
US 2023/0164105 A1 May 25, 2023

Related U.S. Application Data

(63) Continuation of application No. 17/493,111, filed on Oct. 4, 2021, now Pat. No. 11,611,525, which is a
(Continued)

(51) Int. Cl.
H04L 51/226 (2022.01)
G06F 11/30 (2006.01)
(Continued)

(52) U.S. Cl.
CPC ........ H04L 51/226 (2022.05); G06F 11/3006 (2013.01); G06F 11/3438 (2013.01);
(Continued)

(58) Field of Classification Search
CPC ..... H04L 51/226; H04L 51/224; H04L 51/52; G06F 11/3006; G06F 11/3438; G06F 11/3452
See application file for complete search history.

(56) References Cited

U.S. PATENT DOCUMENTS 7,685,192 B1  3/2010  Scofield et al.
7,774,341 B2  8/2010  Aravamudan et al.
(Continued)

OTHER PUBLICATIONS

"U.S. Appl. No. 16/289,275, Advisory Action mailed Sep. 22, 2020", 6 pgs.
(Continued)

Primary Examiner — Oleg Survillo
Assistant Examiner — Monishwar Mohan
(74) Attorney, Agent, or Firm — Schwegman Lundberg & Woessner, P.A.

(57) ABSTRACT

Disclosed are methods and systems for ranking content. In one aspect, a method of ranking content for display includes identifying, via hardware processing circuitry, interactions by a single account with content pairs, each of the content in the content pairs included in a plurality of content, aggregating, via the hardware processing circuitry, the identified interactions across a plurality of accounts, associating, via the hardware processing circuitry, probabilities with each content in the plurality of content based on the aggregated interactions, ranking, via the hardware processing circuitry, the plurality of content based on the associated probabilities; and selecting, via the hardware processing circuitry, content ranked above a threshold for display.

20 Claims, 8 Drawing Sheets

Related U.S. Application Data continuation of application No. 16/289,275, filed on Feb. 28, 2019, now Pat. No. 11,171,908.

(60) Provisional application No. 62/636,767, filed on Feb. 28, 2018.

(51) Int. Cl.
*G06F 11/34* (2006.01)
*H04L 51/224* (2022.01)
*H04L 51/52* (2022.01)

(52) U.S. Cl.
CPC ........ *G06F 11/3452* (2013.01); *H04L 51/224* (2022.05); *H04L 51/52* (2022.05)

(56) References Cited

U.S. PATENT DOCUMENTS

| | | | |
|---|---|---|---|
| 8,195,522 B1 | 6/2012 | Sonne et al. | |
| 8,386,509 B1 | 2/2013 | Scofield et al. | |
| 8,504,437 B1 | 8/2013 | Agarwal et al. | |
| 8,527,357 B1 | 9/2013 | Ganesan | |
| 8,700,465 B1 * | 4/2014 | Liu | G06Q 30/0241 |
| | | | 705/14.52 |
| 9,053,129 B1 | 6/2015 | Covell et al. | |
| 9,213,749 B1 | 12/2015 | Collins et al. | |
| 9,426,232 B1 | 8/2016 | Wilden et al. | |
| 9,483,529 B1 * | 11/2016 | Pasoi | H04L 51/52 |
| 9,582,545 B2 | 2/2017 | Homsany | |
| 9,811,865 B2 | 11/2017 | Baliyan et al. | |
| 11,171,908 B1 | 11/2021 | Barton et al. | |
| 2008/0004989 A1 | 1/2008 | Yi | |
| 2009/0172727 A1 * | 7/2009 | Baluja | H04N 21/2668 |
| | | | 725/34 |
| 2011/0314007 A1 | 12/2011 | Dassa et al. | |
| 2012/0166432 A1 | 6/2012 | Tseng | |
| 2012/0197979 A1 * | 8/2012 | Palm | G06Q 30/0282 |
| | | | 709/203 |
| 2013/0204825 A1 * | 8/2013 | Su | G06N 5/02 |
| | | | 706/46 |
| 2014/0046937 A1 | 2/2014 | Chennavasin | |
| 2014/0067953 A1 | 3/2014 | Weinstein et al. | |
| 2014/0136531 A1 | 5/2014 | Aflalo et al. | |
| 2014/0207564 A1 | 7/2014 | Dubey et al. | |
| 2015/0012468 A1 | 1/2015 | Kegel et al. | |
| 2015/0375104 A1 | 12/2015 | Nishar et al. | |
| 2016/0012485 A1 | 1/2016 | Dong et al. | |
| 2016/0202879 A1 | 7/2016 | Chen et al. | |
| 2016/0224561 A1 | 8/2016 | Agarwal et al. | |
| 2016/0234556 A1 | 8/2016 | Berridge | |
| 2016/0292729 A1 | 10/2016 | Grunewald et al. | |
| 2017/0075890 A1 * | 3/2017 | Luna | G06F 16/9535 |
| 2017/0140428 A1 | 5/2017 | Chakraborty et al. | |
| 2017/0142046 A1 | 5/2017 | Abou Mahmoud et al. | |
| 2017/0200174 A1 | 7/2017 | Martinez et al. | |
| 2017/0220580 A1 | 8/2017 | Chi et al. | |
| 2017/0230438 A1 | 8/2017 | Turkoglu | |
| 2017/0309047 A1 | 10/2017 | Demiralp et al. | |
| 2017/0316305 A1 * | 11/2017 | Liensberger | H04L 67/306 |
| 2017/0318075 A1 | 11/2017 | Liensberger et al. | |
| 2018/0032636 A1 | 2/2018 | Mullaney et al. | |
| 2018/0083907 A1 | 3/2018 | Perlow et al. | |
| 2018/0181570 A1 | 6/2018 | Chou et al. | |
| 2018/0189283 A1 | 7/2018 | Barnett et al. | |
| 2018/0192094 A1 | 7/2018 | Barnett et al. | |
| 2019/0079934 A1 | 3/2019 | Liao et al. | |
| 2019/0163836 A1 * | 5/2019 | Shenoy | G06F 16/951 |
| 2019/0347302 A1 | 11/2019 | Walters | |
| 2020/0162561 A1 | 5/2020 | Milvaney et al. | |
| 2022/0029944 A1 | 1/2022 | Barton et al. | |

OTHER PUBLICATIONS

"U.S. Appl. No. 16/289,275, Examiner Interview Summary mailed May 17, 2021", 2 pgs.

"U.S. Appl. No. 16/289,275, Final Office Action mailed Jul. 28, 2020", 49 pgs.

"U.S. Appl. No. 16/289,275, Non Final Office Action mailed Feb. 26, 2020", 38 pgs.

"U.S. Appl. No. 16/289,275, Non Final Office Action mailed Feb. 26, 2021", 67 pgs.

"U.S. Appl. No. 16/289,275, Notice of Allowance mailed Jul. 2, 2021", 9 pgs.

"U.S. Appl. No. 16/289,275, Response filed May 8, 2020 to Non Final Office Action mailed Feb. 26, 2020", 11 pgs.

"U.S. Appl. No. 16/289,275, Response filed May 26, 2021 to Non Final Office Action mailed Feb. 26, 2021", 13 pages.

"U.S. Appl. No. 16/289,275, Response filed Sep. 1, 2020 to Final Office Action mailed Jul. 28, 2020", 12 pgs.

"U.S. Appl. No. 17/493,111, Notice of Allowance mailed Oct. 31, 2022", 10 pgs.

* cited by examiner

RANKING CONTENT FOR DISPLAY

CROSS REFERENCE TO RELATED APPLICATIONS

This application is a continuation of and claims the benefit of priority of U.S. patent application Ser. No. 17/493,111, filed Oct. 4, 2021, which is a continuation of and claims the benefit of priority of U.S. patent application Ser. No. 16/289,275, filed Feb. 28, 2019, which claims priority to U.S. Provisional Application No. 62/636,767, filed Feb. 28, 2018 and entitled "RANKING CONTENT FOR DISPLAY." The contents of these prior applications are considered part of this application, and are hereby incorporated by reference herein in their entireties.

TECHNICAL FIELD

The present disclosure generally relates to the technical field of prioritizing information. In particular, this disclosure solves the technical problem of sorting notifications in a data stream.

BACKGROUND

As the popularity of social networking grows, users are obtaining more information from their social networks. Users are presented with a large volume of information via their social network connections. In some circumstances, the volume is so large it may be necessary to prioritize the information for the user. Therefore, improved methods of determining how to prioritize information for display to a user are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
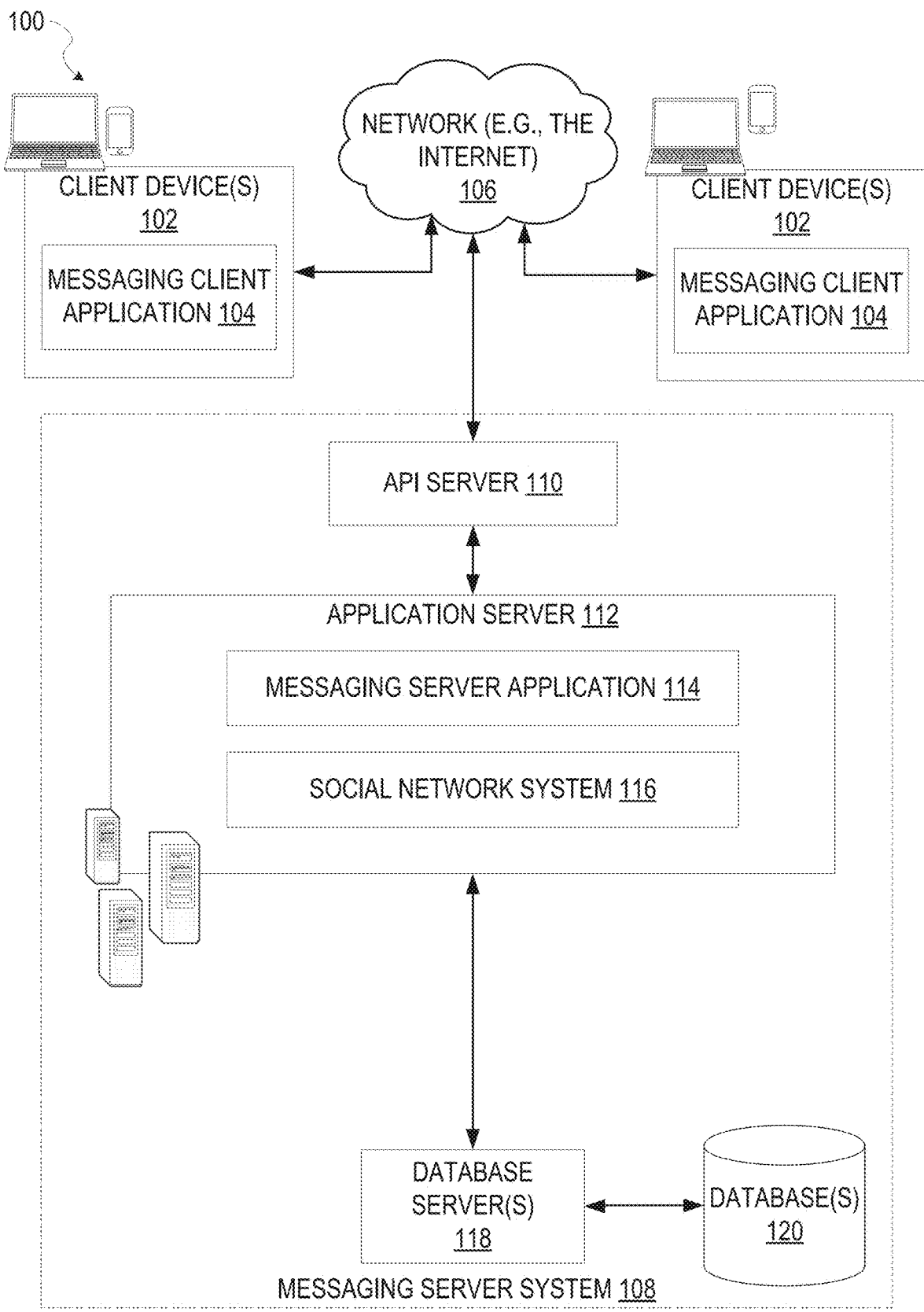
FIG. 1 is a block diagram showing an example messaging system for exchanging data (e.g., messages and associated content) over a network, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some embodiments rank entries or notifications in a feed in a social network. This ranking process may include two phases. In a first indexing phase, content is obtained from content providers. The content may be annotated with signals and feeds for many cohorts that are precomputed. For example, feeds for various combinations of gender/age groups, taxonomy based groups, and high-dimensional embedding groups may be precomputed. In a second phase, a user is matched to one of the precomputed set of content or an efficiently retrievable small set of content, associated feeds are retrieved and user level personalization is applied. For example, content nearby, favorited user content, or salient term boosts may be applied. In the following disclosure, the word cohort may be defined as a set of users which share some common characteristics. A public user is a user whose "view by story" setting is "everyone." In other words, all users of the social messaging system 100 (discussed below) are able to view the user's stories. A recommended user is a public user whose follower count is larger than a threshold, or a user has been so designated by an official account, as approved by an administrator, such as a moderator.

The disclosed embodiments may include an ability for a user to opt-in or to opt out of the methods described herein. For example, some users may prefer that user specific information not be used to custom their user experience. For these users, the disclosed implementations may provide an ability for the user to disable or otherwise inhibit the collection, storage, and use of user specific information for the purposes of prioritizing information for display.

In some aspects, the content is selected, based on part, on content previously viewed by the user. The system may also distinguish between the quality of the previous view by the user. For example, if the user scrolled past particular content, this view may be given a particular weight. If the user paused at the content and viewed it for more than a threshold period of time, this view may be given a higher weight.

The system makes use of a number of concepts, which will be defined below. First, a session may be considered a period of time when a user is actively engaging continuously with the client messaging application 104. For example, in some aspects, activity occurring by a user, which includes a user input within a threshold period of time (e.g. 30 second, 1 minute, 2 minutes, etc.), may be considered to be part of the same session. Alternatively, a user session may include events within a past elapsed period of time, such as a past minute, two minutes, etc. Thus, even if user input was continuous in this embodiment, only the continuous inputs within the elapsed period of time would be considered part of the same session.

An impression as discussed below, is content displayed to the user, with an indication that the user viewed the content. Thus, for example, if a scroll rate of the user exceeds a threshold value while the content is displayed, this content may be determined to have not been viewed. In some aspects, if less than a threshold percent of a content thumbnail is displayed, this display of content may not be considered a view in some aspects. Content that only partially loads may also not be considered to be viewed in some aspects.

Content that fully loads and is visible to a user for greater than a threshold number of seconds may be considered a view in some aspects. In some aspects, a further criteria may consider whether the content was visible when displayed. For example, in some cases, the content may be obscured by other windows on a user display. Thus, if the content was greater than a threshold percent obscured, this content may not be considered to be displayed. Similarly, if less than a threshold percent of the content was obscured, the content may be considered to be viewed, if the content was displayed for greater than a threshold period of time. In some cases, a visual position of content may affect a determination of whether the content is considered viewed or not. For example, if content is adjacent to or previous to content selected by the user, the content may be considered to be viewed. Furthermore, if content is selected or tapped by the user, the disclosed embodiments may consider the content to be viewed.

The disclosed embodiments may also define a user "tap" of content. A "tap" may include selection of content, may also require additional criteria to be satisfied before at least some of the disclosed embodiments consider the content to be "tapped." For example, in some aspects, the following criteria, in addition to select of the content by the user, may be satisfied before the selection is considered a "tap"; selecting a video, and watching the video until it completes, selecting a video, closing it, reopening the video, and watching it until its completion, selection of video content, and the user watched greater than a threshold percent or greater than a threshold amount of time of the video content, if the content is shared by a user, the user may be considered to have viewed the content, or if the user "liked" the content. As a contrary example, selection of content may not be considered, if, for example, the user selects content and then immediately closes the resulting window displaying the content, and the user does not reopen the content. Similarly, if the user closes the view window before the content loads into the view window, this may also not be considered a view in some aspects.

The disclosed embodiments may also define "co-tap" events. A "co-tap" occurs when a user selects two different content within a particular session. Thus, for example, if a user selects six unique content in a session, a total of fifteen unique pairs of unique tapped contents provides 15 co-taps. (5+4+3+2+1).

The disclosed embodiments may further consider a "co-tap ratio" between two pieces of content. This is a ratio of total tap-to-tap over total tap-impressions for the content pair. The co-tap ration may be discounted for a small number of samples. For example, the ratio may be multiplied by a sigmoid of a total number of tap impressions. Equation 1 below may be used in some embodiments:

$$CoTap_{B:A} = \#TapTap_{AB}/\#Tap_A Impression_B \times sigmoid(\#Tap_A Impression_B) \quad (1)$$

As one example, if 100 users viewed two pieces of content A & B, and both pieces of content were considered to be viewed by all 100 users, and 45 users selected or "tapped" on both of them, then the co-tap ratio for this pair of content would be 0.45. Generally, the higher the co-tap ratio, the more related two pieces of content are.

In some aspects, priori click through information may be considered when determining whether to select particular content. For example, if the number of co-taps of content B with A is greater than the number of taps of B/# of impressions of B, then the co-taps of B and A may be particularly relevant.

In some aspects, a co-tap ratio for every pair of content is determined. Then, for each piece of content, a ranked list of other content is generated. The ranking may be based on a co-tap ratio for the piece of content and the other piece of content. When a client requests additional content for display, the client may include a list of recently selected or tapped content. The list of recently selected content is used to determine a top ranked second list of other content with a high co-tap ratio with at least one piece of content in the list. The second list of content may then be returned to the client for display.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
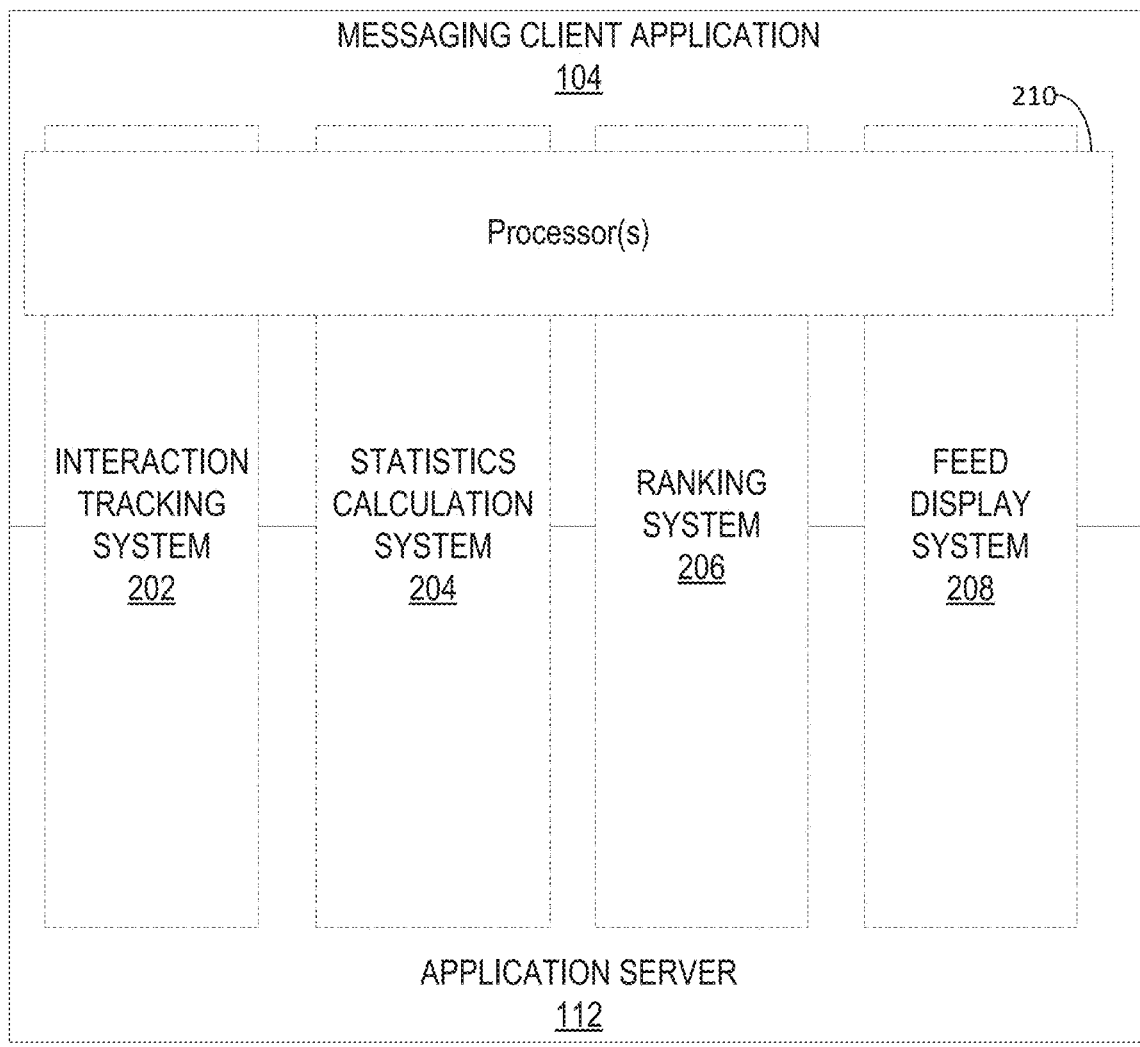
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an interaction tracking system 202, a statistics calculation system 204, a ranking system 206, and a feed display system 208.

The interaction tracking system 202 is configured to track interactions between content and an account, such as a user account. The interaction tracking system 202 may determine whether an account viewed an individual piece of content and/or selected the individual piece of content. A determination of whether content was viewed may be based on an amount of time the content was displayed on a device logged into the account. For example, a user may scroll quickly through some content such that the content appears for, for example, less than one half of a second. This may not be considered viewing the content in some embodiments. In other words, viewing of content may require the content to be displayed on the device for a threshold period of time. Selecting the content may be determined when a user taps or swipes in a particular direction on the content. In some aspects, the interaction tracking system 202 may further determine a percentage of a video that was viewed by an account. For example, a one minute long video that is played for six seconds may be considered 10% viewed in some embodiments. Thus, a determination of whether particular content was viewed may be a binary indication, such as an indication the content was viewed or was not viewed. Alternatively, the indication may represent an integer value, that may, in some embodiments, represent a percentage of the content that was viewed.

The statistics calculation system 204 computes statistics relating to content viewing and selecting by accounts of the social network system 116. As discussed in more detail below, the statistics calculation system 204 may compute a number of times particular content was viewed and a second number of times the content was selected. Probabilities that a particular content may be viewed and or selected by an account may be determined based on other content viewed and/or selected by an account. These probabilities may then be used to rank content for display within the account. For example, content with the highest probabilities of being viewed and/or selected may be displayed to the account in some embodiments. In some embodiments, the statistics calculation system determines statistics off line, or in other words, at a time disconnected from specific requests for content. By calculating the statistics off line and in advance, latency for providing content to an account when requested is reduced, as the statistics are already determined and may not need to be calculated while an account is waiting for requested content to be delivered.

The ranking system 206 ranks content based on the statistics calculated by the statistics calculation system 204. The ranking system 206 may periodically rank content in advance such that when content is requested by a user, the rankings are available. In some aspects, portions of ranked content may be determined in advance, while a second portion is determined in response to a request for content by an account. The two portions of content may then be blended into a single set of ranked content, which is then displayed to an account based on the blended ranking. By separating the ranking process into an offline portion and an online portion, the ranking system provides low latency resulting from the offline determination of a majority of the content ranking, while still providing a ranking system that is flexible and responsive to recent user activity.

The feed display system 208 provides for display of content ranked by the ranking system 206. The feed display system 208 may cause display of ranked content on a client device 102 in some embodiments. For example, in some aspects, this may be accomplished by transmitting data defining a user interface displaying the content. For example, html and/or xml data may be transmitted to a client device 102 to cause display of the ranked content. In some aspects, the feed display system 208 may redirect content to other output devices besides a display. For example, in some aspects, ranked content may be transmitted over a network or written to a stable storage medium, such as a file system.

To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the messaging system 100 to facilitate additional functionality that is not specifically described herein.

The above referenced functional components of the messaging system 100 are configured to communicate with each other (e.g., via a bus, shared memory, a switch, or APIs). Collectively, these components facilitate presenting of a feed of information content to a social network user based on content of the social network. In other words, the interaction tracking system 202, the statistics calculation system 204, the ranking system 206, and the feed display system 208 work together to present a prioritized set of content for display on a display of a client device 102.

As is understood by skilled artisans in the relevant computer and Internet-related arts, each functional component illustrated in FIG. 2 may be implemented using hardware (e.g., a processor of a machine) or a combination of logic (e.g., executable software instructions) and hardware (e.g., memory and the processor of a machine) for executing the logic. For example, any component included as part of the messaging system 100 may physically include an arrangement of one or more processors 210 (e.g., a subset of or among one or more processors of a machine) configured to perform the operations described herein for that component. As another example, any component of the messaging system 100 may include software, hardware, or both, that configure an arrangement of the one or more processors 210 to perform the operations described herein for that component. Accordingly, different components of the messaging system 100 may include and configure different arrangements of such processors 210 or a single arrangement of such processors 210 at different points in time.

Furthermore, the various functional components depicted in FIG. 2 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 3-8.

Figure 3:
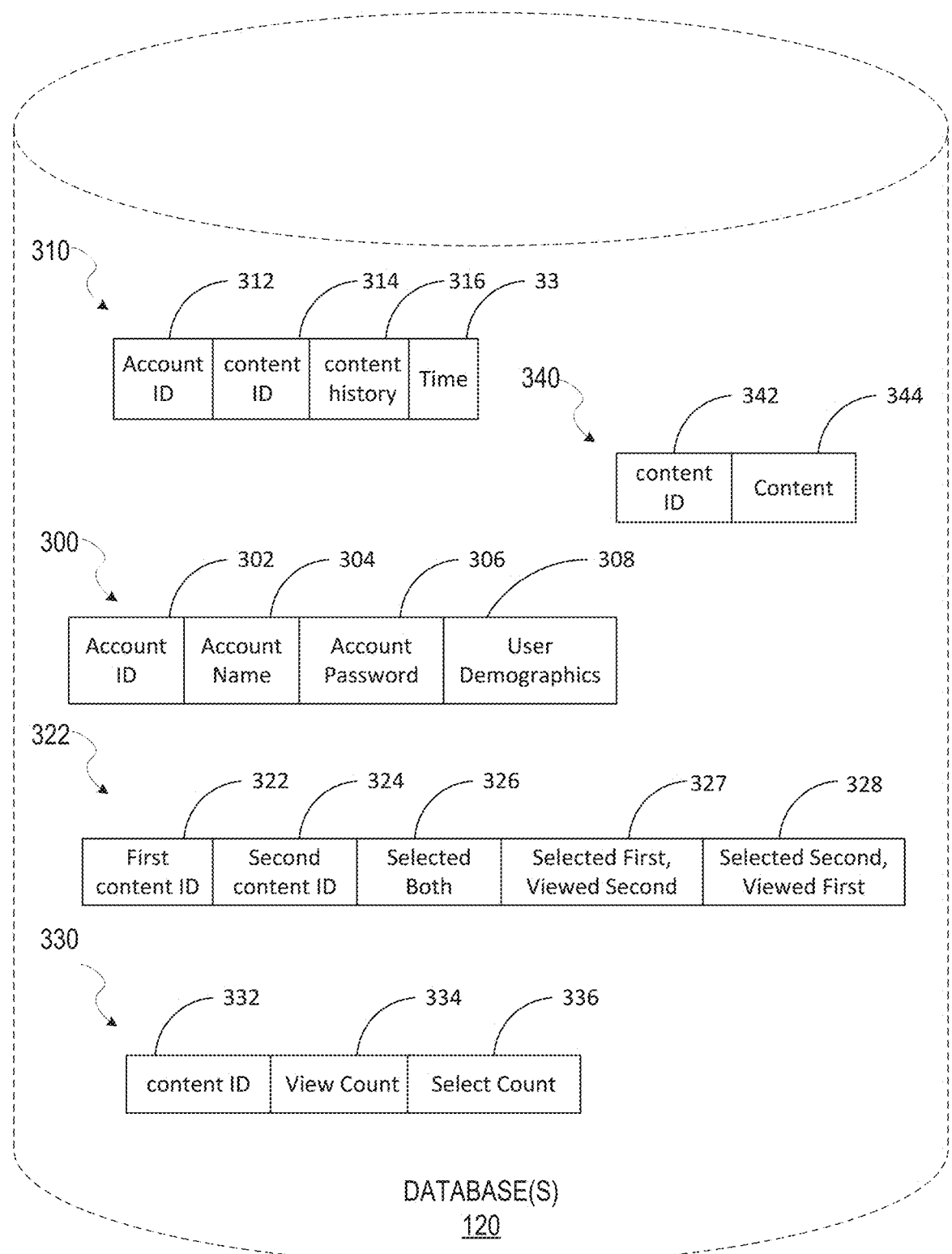
FIG. 3 is a schematic diagram illustrating data which may be stored in a database of the messaging system, according to some embodiments.

FIG. 3 shows example data structures that may be implemented in one or more of the disclosed embodiments. While the data structures illustrated in FIG. 3 are shown as relational database tables, one of skill would understand that the data structures could be implemented using a variety of technologies known in the art, such as via in memory data structures such as trees or linked lists, queues, unstructured data stores or any other data storage technology.

FIG. 3 shows an account table 301, story history table 1910, story combination table 320, and a story statistics table 330. The account table 301 includes an account identifier 302, account name field 304, an account password field 306 and user demographics 308. The account identifier 302 uniquely identifies a particular account, such as an account for the social network 116. The account name field 304 provides a character based name for the account identified by the field 302. The character based name may be included in authentication credentials for the account. The account password field 306 stores password information for the account identified by the account identifier 302. The user demographics field 308 stores information relating to demographics of a user of the account identified by account identifier 302. For example, the user demographics field 308 may indicate an age, gender, address, and other demographic information. In some aspects, the demographic information may be used to better match the user with content more likely to be of interest.

The content history table 310 includes an account identifier field 312, story identifier field 314, and a story history field 316. The account identifier field 312 may be cross reference with other account identifier fields, such as account identifier 302. The story identifier field 314 identifies a story or individual piece of content. The content may include text, video, audio, or a combination of media types. The story history field 316 indicates activity between the account identified by the account identifier field 312 and the story identified by the story identifier field 314. The story history field 316 indicates whether the account identified by the account identifier field 312 has selected or viewed the story identified by the story identifier field 314. If there has been no activity between the account identified via 312 and the story identified via 314, there may not be an entry in the story history table 310.

The story combination table 322 stores information relating two stories. The first and second story identifiers 322 and 324 store identifiers for two stories. The selected both field 326 counts a number of accounts that have selected both stories. The selected first, viewed second field 327 counts a number of accounts that selected the first story but only viewed the second story, while the selected second, viewed first field 328 stores a number of accounts that selected the second story (e.g. 324) but only viewed the first story (e.g. 322).

The story statistics table 330 stores a story identifier 332, view count for the story (identified via 332) 334, and a selected count for the story (identified via 332) 336.

The story table 340 stores a story identifier 342 and content defining the story 342. The content may include web pages, xml, text, audio, video, or any type of content, including multimedia content.

Figure 4:
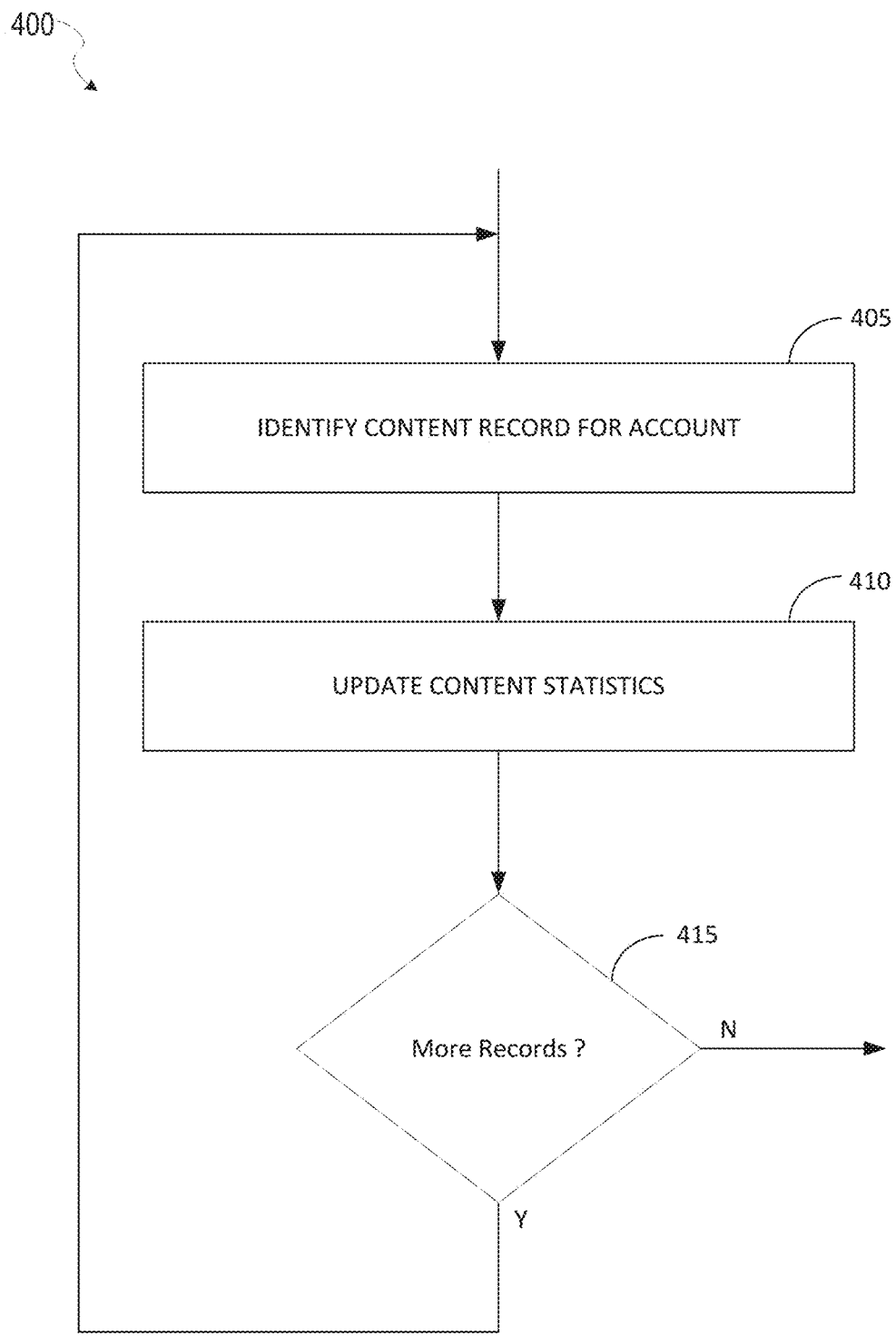
FIG. 4 is a flowchart of a method for displaying content.

FIG. 4 is a flowchart of a method for displaying content. In some aspects, one or more of the functions discussed below may be performed by hardware processing circuitry. For example, in some aspects, instructions 810 stored in memory 814 may configure processor 804 to perform one or more of the functions discussed below with respect to FIG. 4.

In operation 405, a content record for an account is identified. The content record may store information regarding one or more of a content view and/or a content selection by the account. In some aspects, operation 405 may identify a content record in a data store, such as the data store 310, discussed above with respect to FIG. 3. For example, operation 405 may search a data store (e.g. 310) for a particular account identifier (e.g. 312). A corresponding content identifier (e.g. 314) may be associated with the account identifier in the data store (e.g. 310). A history of interaction between the account (e.g. 312) and the content (314) may be stored in the data store (e.g. 316). For example, the history may indicate whether the account (e.g. 312) viewed and/or selected the content (e.g. 314). A time (e.g. 318) of the interaction between the account (e.g. 312) and the content (e.g. 314) may also be stored in the data store in some aspects.

In operation 410, statistics for the content are updated. For example, in some aspects, operation 410 may update statistical data for the identified content. For example, a database (e.g. 332) may store view and or selection metrics or counts for the content (e.g. 330). Based on the history indicated in the record identified in operation 405, statistics counting a number of views (e.g. 334) of the content and/or a number of selections of the content (e.g. 336) may be incremented.

Decision operation 415 determines whether there are additional records to scan. For example, process 400 may run periodically, and scan only those new content records (e.g. records in the data store 310) that were created since the previous iteration. If there are more records to scan, process 400 returns to operation 405.

Figure 5:
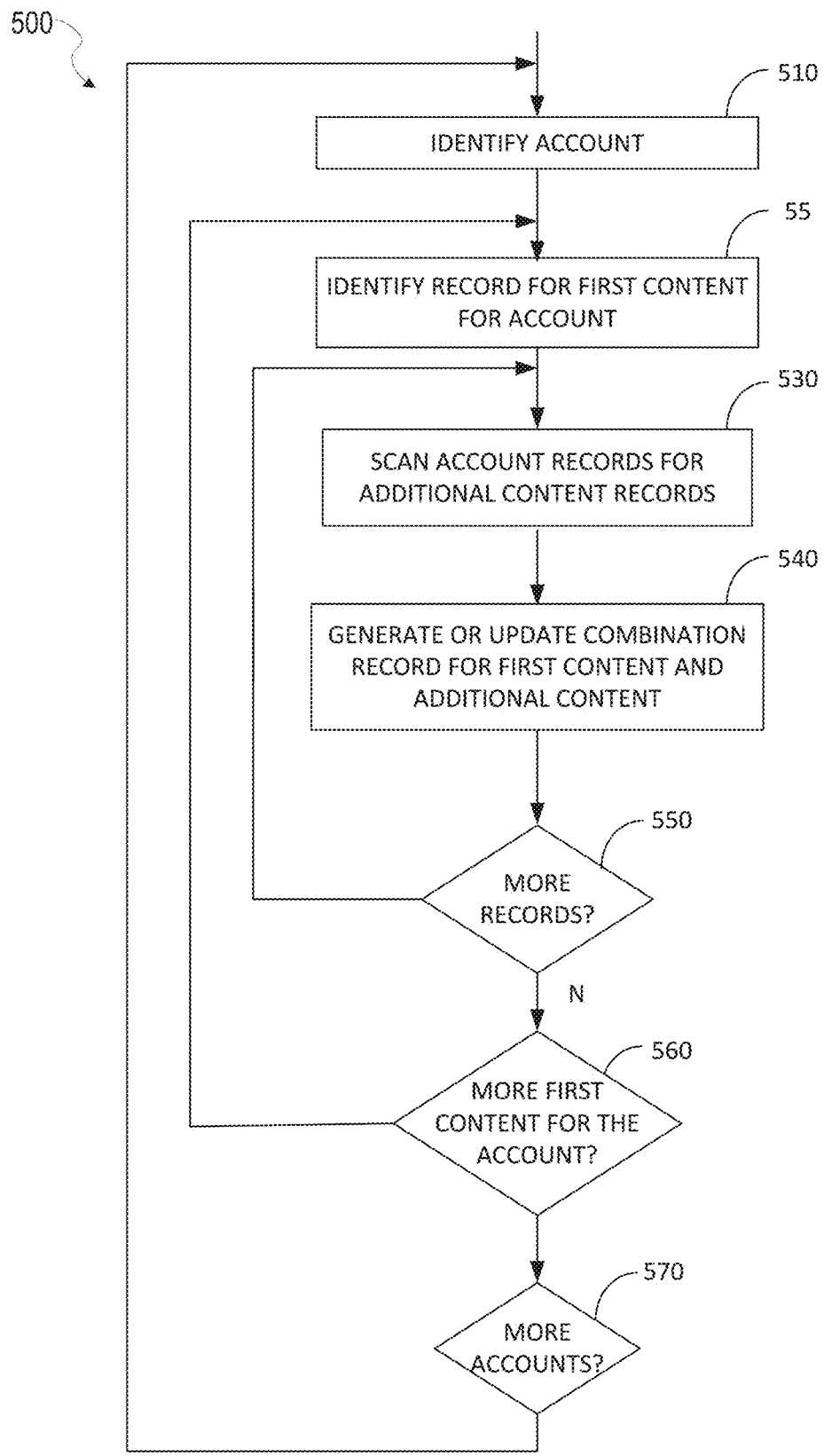
FIG. 5 is a flowchart of a method for generating ranking statistics for content.

FIG. 5 is a flowchart of a method for generating statistics for ranking content. In some aspects, one or more of the functions discussed below may be performed by hardware processing circuitry. For example, in some aspects, instructions 810 stored in memory 814 may configure processor 804 to perform one or more of the functions discussed below with respect to FIG. 5.

In some aspects, process 500 discussed below with respect to FIG. 5 describes a process for creating metrics representing probabilities that particular content will be viewed and/or selected based on other content that has been viewed and/or selected by a single account. These metrics may be used by some embodiments of this disclosure when determining a set of content to display to a user, for example, via a client device 102.

In operation 510, an account is identified. For example, operation 510 may read an account data store (e.g. 300) that stores information relating to accounts supported by the social network system 116 to identify an account (e.g. 302).

In operation 520, a data store (e.g. 310) is searched to identify a record indicating interaction between a first content (e.g. 314) and the account 312). In other words, a record is identified that indicates the identified account viewed and/or selected the first content in some aspects.

In operation 530, records for the account are scanned to identify additional content viewed and/or selected by the account. For example, the data store (e.g. 310) may be searched to identify other content having interactions with the account, besides the first content.

In operation 540, a combination record is updated or generated as needed to record that both the first content and the additional content were viewed and/or selected by the account. For example, operation 540 may update a data store (e.g. 322) that tracks interactions between accounts and multiple content (e.g. 324, 322). The data store may be updated to increment one or more counters (e.g. 326 and/or 327 and/or 328) tracking how many accounts have had interactions with both the first content (322) and the additional content (e.g. 324).

Decision operation 550 determines if there are additional records for the account showing interactions with other content besides the first content. If there are, processing returns to operation 530.

Decision operation 560 determines if additional content interaction records exist for the first content. In other words, each content having interaction with a particular account should be represented as a first content at some point during operation of process 500, to ensure all combinations of interacted content pairs are considered. For example, during one iteration of operation 560, a content "A" may be the first content. During another iteration of operation 560, a content "B" may be first content.

Decision operation 570 determines if additional accounts remain to be considered. In other words, process 500 prepares statistics for combination of content viewed by all or at least most accounts of the social network system 116.

Figure 6:
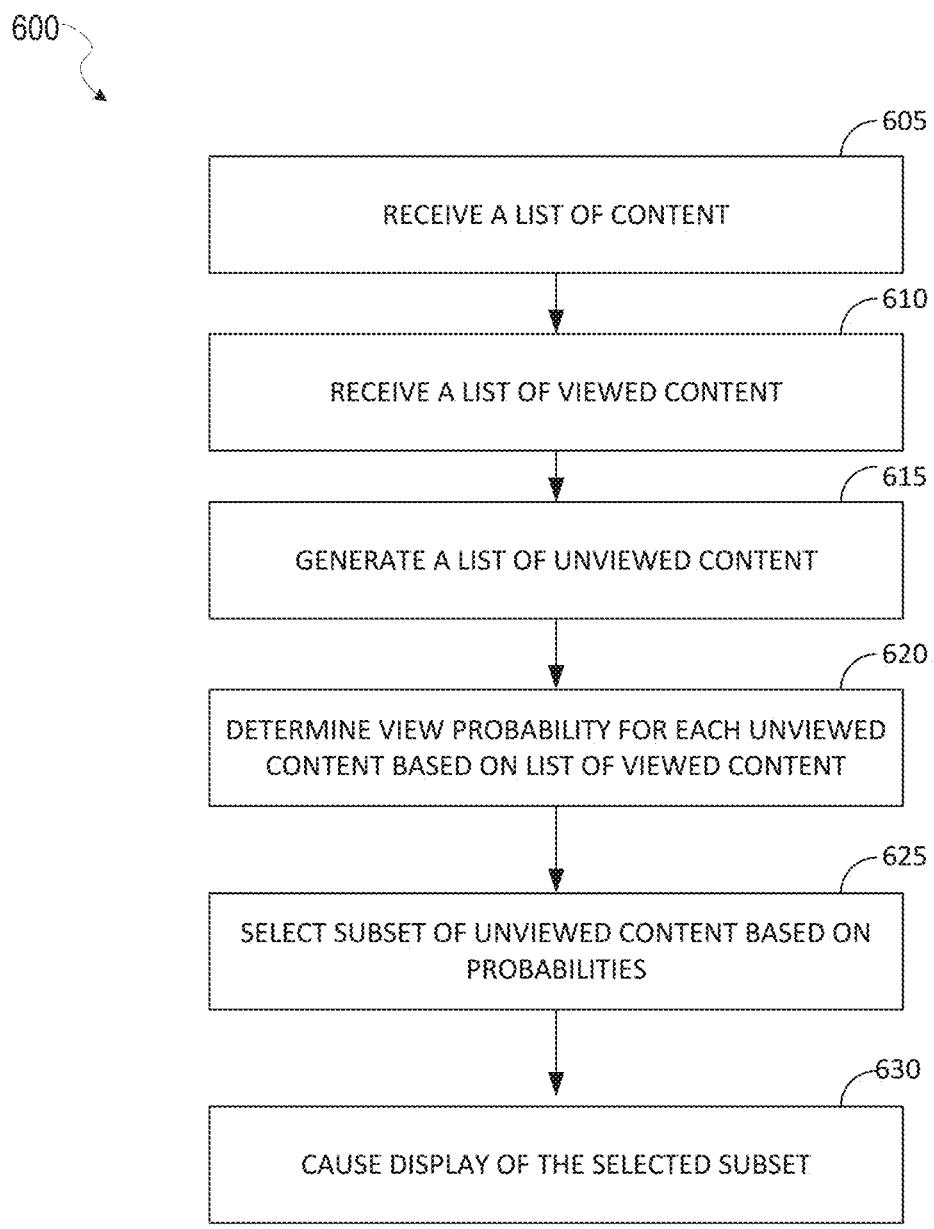
FIG. 6 is a flowchart of a method for displaying content.

FIG. 6 is a flowchart of a method for displaying content. In some aspects, one or more of the functions discussed below may be performed by hardware processing circuitry. For example, in some aspects, instructions 810 stored in memory 814 may configure processor 804 to perform one or more of the functions discussed below with respect to FIG. 6.

In operation 605, a list of content is received. For example, in some aspects, a list of content may be read from a content database, such as content database 342, discussed above with respect to FIG. 3.

In operation 610, a list of viewed content is received. The viewed content may be content viewed or displayed within a particular account (e.g. 302) within a predetermined time period. To obtain the list, a database may be searched based on the particular account to identify the viewed content. As one example, FIG. 3 illustrates a story history table 310 that servers as an example data structure that could support operation 610.

In operation 620, a list of unviewed content is determined. In some aspects, operation 620 identifies content in the list of content received in operation 605 that is not included in the list of viewed content received in operation 610.

Operation 620 determines a view probability for each unviewed content. The probabilities are based on the list of viewed content. In some aspects of operation 620, a list of content combinations are generated. Each of the content combinations may include at least two stories. Based on a number of accounts that selected both stories in the combination, and a number of accounts that selected one of the stories in the combination, a probability that a particular one of the two stories is determined. For example, in some aspects, operation 620 determines:

I_a: a number of accounts that viewed content A,
I_b: a number of accounts that viewed content B,
T_a: a number of accounts who selected content A,
T_b: a number of accounts who selected content B,
T_a & T_B: a number of accounts that selected both content A and content B,
T_a*I_b: a number of accounts that selected content A and viewed, but did not select, content B.

From this information, operation 620 may determine a probability for each of the unviewed stories. In some aspects, the probability may be determined as:

$$P(B|A)=(T\_a\ \&\ T\_b)/(T\_a\ \&\ I\_b) \quad (1)$$

where:
P(B|A) is the probability that content B will be viewed given that content A was already viewed by the account.

In some aspects, the probability will be smoothed. For example, in some aspects, the following Equation 2 may be used to generate the probability:

$$P(B|A)=((T\_a\ \&\ T\_b)+(S*K))\ ((T\_a\ \&\ b)+S) \quad (2)$$

where:
K=click through rate (CTR). This may be the average CTR for content.
S=smoothing parameter, exemplary value of 1000, but may be tuned in various embodiments to different values.

In some aspects, additional values may be computed to enhance or augment the probability determinations. For example, a value "lift" may be determined in some aspects, via equation (3) below:

$$\text{Lift}(B|A)=P(B|A)/P(B) \quad (3)$$

where:
P(B) is a probability of selecting B when B is viewed. In some aspects, this may be measured via a smoothing estimation (using a click through rate and smoothing parameter as described above).

Generally, a left value equal to one (1) may indicate that content A has no influence on content B. If lift is greater than one (1), then accounts viewing content A are more likely to view content B than other accounts not viewing content A. If lift<one (1), accounts viewing content A are less likely to view content B than accounts not viewing content A.

In some aspects, a compensated lift value may be determined, for example, as specified in equation 4 below:

$$\text{lift\_compensated}(B|A)=P(B|A)/(P(B)^e) \quad (4)$$

where:
e is a compensation constant. One possible value is 0.5.

In operation 625, a subset of the unviewed content is selected based on the determined probabilities. In some aspects, a predetermined number (e.g. 20) of content B having a highest lift compensated value (BA) for each viewed content (from operation 610) is selected. This may result in a total number of selected stories approximated by the predetermined number*number of unviewed content (of operation 615) having the highest lift compensated values.

From the total number of content having the highest lift compensated values, the content may be ranked via an additional process using equation 5 below:

$$\text{combined\_lift}(B)=(1-\text{prod}\_\{i=0,\ldots K\}(1-P(B|A\_i)))/(P(B)^e) \quad (5)$$

where:
prod_ is a function that returns a product of a sequence of terms, in this case, the terms are input parameters to the prod_function.
K is a number of previously viewed stories (from operation 610)
E is an experimental content (e.g 0.5).

Some embodiments may further compute a final score for each unviewed content B as final score(B)=baseline_score×R^(squash(combined_lift (B))

where:
R is a small integer >1.0 and squash ( ) is a function that smoothly maps an input value to a range [0.0, 1.0). Possible values for R include anywhere in the range 1.3-1.7,
baseline_score is the combined lift score of (B) or any other score discussed throughout this application or the priority application.

In operation 630 the selected subset is displayed, or caused to be displayed. For example, in some aspects, a feed may be displayed on a client device 102 by the social network system 116. In some aspects, operation 630 may be performed by a back end system, such as a server or multiple servers. In these aspects, causing the selected subset to be displayed may include sending data to a client device, the data defining the selected subset for display. For example, in some aspects, the data defining the selected subset may include both the selected subset and data defining a user interface, such as html or xml data defining the user interface.

Software Architecture

Figure 7:
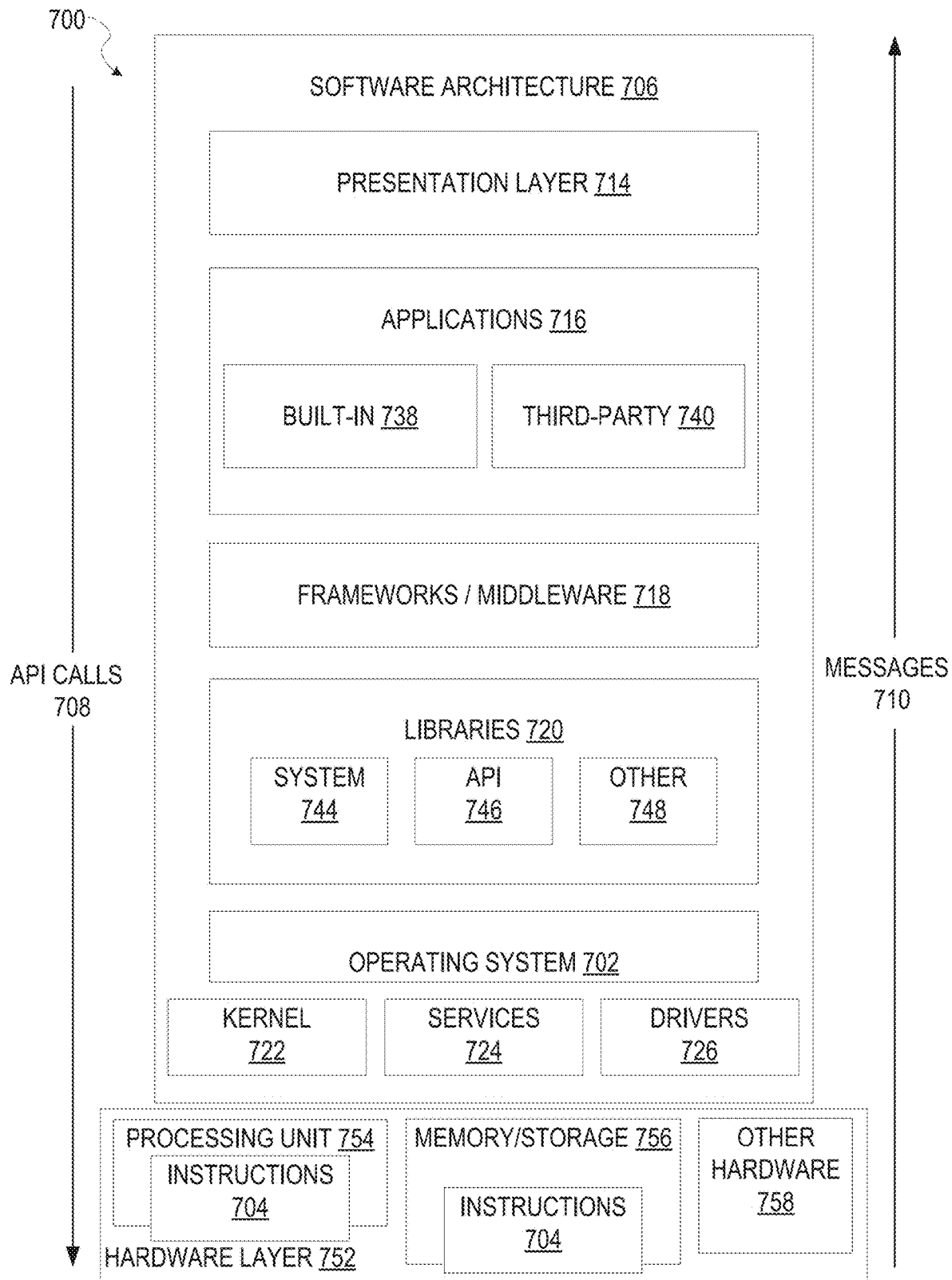
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as a machine 800 of FIG. 8 that includes, among other things, processors 804, memory/storage 806, and I/O components 818. A representative hardware layer 752 is illustrated and can represent, for example, the machine 800 of FIG. 8. The representative hardware layer 752 includes a processing unit 754 having associated executable instructions 704. The executable instructions 704 represent the executable instructions of the software architecture 706, including implementation of the methods, components, and so forth described herein. The hardware layer 752 also includes memory and/or storage 756, which also have the executable instructions 704. The hardware layer 752 may also comprise other hardware 758.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response as messages 710. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as the presentation layer 714. In these systems, the application/component "logic" can be separated from the aspects of the application/component that interact with a user.

Exemplary Machine

Figure 8:
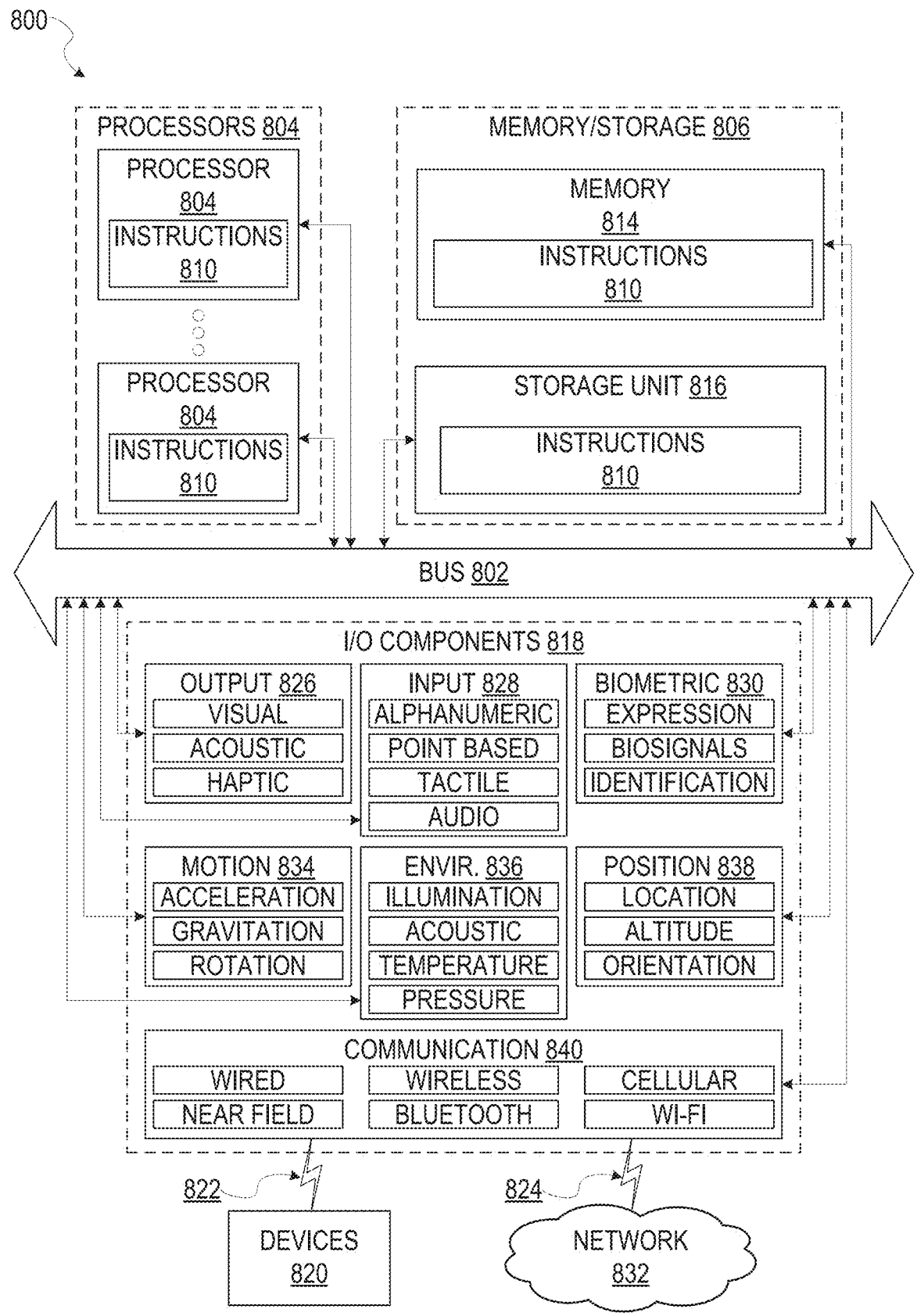
FIG. 8 is a block diagram illustrating components of a machine, according to some exemplary embodiments, able to read instructions from a machine-readable medium (e.g., a machine-readable storage medium) and perform any one or more of the methodologies discussed herein.

FIG. 8 is a block diagram illustrating components (also referred to herein as "modules") of a machine 800, according to some exemplary embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 818 may include a wide variety of components to provide a user interface for receiving input, providing output, producing output, transmitting information, exchanging information, capturing measurements, and so on. The specific I/O components 818 that are included in the user interface of a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various exemplary embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 828 may also include one or more image-capturing devices, such as a digital camera for generating digital images and/or video.

In further exemplary embodiments, the I/O components 818 may include biometric components 830, motion components 834, environment components 836, or position components 838, as well as a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822 respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
generating a statistics table that separately tracks content item views from content item selections across a plurality of users, the statistics table comprising:
a first view count for a first content item and a first selected count for the first content item, the first view count being incremented each time the first content item is viewed by one or more users of the plurality of users responsive to selection by the one or more users of an adjacent content item, and the first selected count being incremented each time the first content item is selected by the one or more users of the plurality of users by swiping in a particular direction on the first content item, and a second view count for a second content item and a second selected count for the second content item, the second view count being incremented each time the second content item is viewed by the one or more users of the plurality of users and the second selected count being incremented each time the second content item is selected by the one or more users of the plurality of users;
measuring an average click through rate of a plurality of content comprising the first and second content items;
determining relevance between the first and second content items based on the statistics table; and
smoothing a probability indicating the relevance between the first and second content items based on the average click through rate.

2. The method of claim 1, further comprising:
computing, based on the first and second view counts, a view number representing a quantity of users who viewed both the first content item and the second content item;
determining, based on the first and second selected counts, that each user in a subset of the users, within an elapsed period of time comprising a same respective session, performed interactions in relation to the first content item and the second content item; and
computing a relevance value as a function of a quantity of users in the subset of users and the view number, the relevance value relating the quantity of users who selected and viewed the first and second content items to the quantity of users who viewed both the first and second content items without selecting one of the first or second content items, wherein the relevance between the first and second content items is based on the computed relevance value.

3. The method of claim 1, further comprising:
identifying interactions by a first account with a content pair comprising the first content item and the second content item based on the statistics table; and
aggregating interactions with the first content item and the second content item across a plurality of accounts.

4. The method of claim 3, wherein the interactions performed by each user in a subset of users comprise a first type of interaction corresponding to selection of the first content item and the second content item, and a second type of interaction satisfying at least one additional criteria, and the method further comprising computing a co-tap ratio for the content pair, the co-tap ratio representing a quantity of users who viewed both the first content item and the second content item.

5. The method of claim 4, further comprising:
receiving a request from a second account to display a first list of content comprising the second content item; and
based on the co-tap ratio, causing a second list of content comprising the first content item to be displayed in response to receiving the request from the second account to display the first list of content comprising the second content item.

6. The method of claim 1, further comprising:
identifying first interactions that include selection of both first and second content items, and aggregating the first interactions across a plurality of content;
identifying second interactions that include selection of only one of the first and second content items;
aggregating the second interactions across the plurality of content; and
associating the probability indicating the relevance between the first and second content items based on the aggregation of the first interactions and the second interactions.

7. The method of claim 1, comprising:
establishing a first collection of content items comprising at least the first content item, and a second collection of content items; and
storing, in the statistics table, a count value representing a number of accounts that selected the first collection of content items but only viewed the second collection of content items.

8. The method of claim 7, further comprising:
measuring a second click through rate for each of a plurality of content; and
normalizing the probability based on the second click through rate of the respective content.

9. The method of claim 8, further comprising raising each of the second click through rates by a constant, wherein the normalizing of the probability is based on the respective raised second click through rate of the respective content.

10. The method of claim 1, further comprising:
determining that less than a threshold percentage of a thumbnail corresponding to a third content item, is displayed; and
excluding the third content item from being included among tracked interactions.

11. The method of claim 1, wherein the probability indicating relevance between the first and second content items is computed based on a first number of accounts that selected or viewed only the first content item, a second number of accounts that selected or viewed only the second content item, a third number of accounts that selected both the first and the second content items, and a fourth number of accounts that selected the first content item and viewed the second content item without selecting the second content item.

12. The method of claim 1, further comprising maintaining a first value representing a number of views of the first content item and a second value representing a number of selections of the first content item.

13. A system for ranking content for display, comprising:
hardware processing circuitry; and
one or more hardware memories comprising instructions that when executed configure the hardware processing circuitry to perform operations comprising:

generating a statistics table that separately tracks content item views from content item selections across a plurality of users, the statistics table comprising:
a first view count for a first content item and a first selected count for the first content item, the first view count being incremented each time the first content item is viewed by one or more users of the plurality of users responsive to selection by the one or more users of an adjacent content item, and the first selected count being incremented each time the first content item is selected by the one or more users of the plurality of users by swiping in a particular direction on the first content item, and a second view count for a second content item and a second selected count for the second content item, the second view count being incremented each time the second content item is viewed by the one or more users of the plurality of users and the second selected count being incremented each time the second content item is selected by the one or more users of the plurality of users;
measuring an average click through rate of a plurality of content comprising the first and second content items;
determining relevance between the first and second content items based on the statistics table; and
smoothing a probability indicating the relevance between the first and second content items based on the average click through rate.

14. The system of claim 13, the operations further comprising:
computing, based on the first and second view counts, a view number representing a quantity of users who viewed both the first content item and the second content item;
determining, based on the first and second selected counts, that each user in a subset of the users, within an elapsed period of time comprising a same respective session, performed interactions in relation to the first content item and the second content item; and
computing a relevance value as a function of a quantity of users in the subset of users and the view number, the relevance value relating the quantity of users who selected and viewed the first and second content items to the quantity of users who viewed both the first and second content items without selecting one of the first or second content items, wherein the relevance between the first and second content items is based on the computed relevance value.

15. The system of claim 13, the operations comprising:
identifying interactions by a first account with a content pair comprising the first content item and the second content item based on the statistics table; and
aggregating interactions with the first content item and the second content item across a plurality of accounts.

16. The system of claim 15, wherein the interactions performed by each user in a subset of users comprise a first type of interaction corresponding to selection of the first content item and the second content item, and a second type of interaction satisfying at least one additional criteria, and the operations further comprising computing a co-tap ratio for the content pair, the co-tap ratio representing a quantity of users who viewed both the first content item and the second content item.

17. The system of claim 16, the operations further comprising:
receiving a request from a second account to display a first list of content comprising the second content item; and
based on the co-tap ratio, causing a second list of content comprising the first content item to be displayed in response to receiving the request from the second account to display the first list of content comprising the second content item.

18. The system of claim 13, the operations further comprising:
identifying first interactions that include selection of both first and second content items, and aggregating the first interactions across a plurality of content;
identifying second interactions that include selection of only one of the first and second content items;
aggregating the second interactions across the plurality of content; and
associating a probability indicating the relevance between the first and second content items based on the aggregation of the first interactions and the second interactions.

19. The system of claim 13, the operations further comprising:
determining whether the first content item is viewed or not based on a visual position of the first content item relative to the adjacent content item.

20. A non-transitory computer readable storage medium comprising instructions that when executed configure hardware processing circuitry to perform operations comprising:
generating a statistics table that separately tracks content item views from content item selections across a plurality of users, the statistics table comprising:
a first view count for a first content item and a first selected count for the first content item, the first view count being incremented each time the first content item is viewed by one or more users of the plurality of users responsive to selection by the one or more users of an adjacent content item, and the first selected count being incremented each time the first content item is selected by the one or more users of the plurality of users by swiping in a particular direction on the first content item, and a second view count for a second content item and a second selected count for the second content item, the second view count being incremented each time the second content item is viewed by the one or more users of the plurality of users and the second selected count being incremented each time the second content item is selected by the one or more users of the plurality of users;
measuring an average click through rate of a plurality of content comprising the first and second content items;
determining relevance between the first and second content items based on the statistics table; and
smoothing a probability indicating the relevance between the first and second content items based on the average click through rate.

* * * * *